(12) United States Patent
Anand et al.

(10) Patent No.: US 8,071,150 B2
(45) Date of Patent: Dec. 6, 2011

(54) PROCESSING TECHNIQUE TO THAW PARTIALLY FROZEN FRUITS AND VEGETABLES AND INCORPORATING SOLIDS

(75) Inventors: Ashish Anand, Plano, TX (US); Varadharajan Radhamani Basker, Plano, TX (US); Phillip Frazier, Frisco, TX (US); Richard Lai, Plano, TX (US); Vamshidhar Puppala, McKinney, TX (US); William Cartwright Weller, McKinney, TX (US)

(73) Assignee: Frito-Lay North America, Inc., Plano, TX (US)

(*) Notice: Subject to any disclaimer, the term of this patent is extended or adjusted under 35 U.S.C. 154(b) by 893 days.

(21) Appl. No.: 11/963,428

(22) Filed: Dec. 21, 2007

(65) Prior Publication Data
US 2009/0162504 A1   Jun. 25, 2009

(51) Int. Cl.
*A23C 3/00* (2006.01)

(52) U.S. Cl. ......... 426/524; 426/281; 426/520; 426/615

(58) Field of Classification Search ................. 426/639, 426/640, 615, 665, 281, 520, 523, 524, 384, 426/438
See application file for complete search history.

(56) References Cited

U.S. PATENT DOCUMENTS

| | | | |
|---|---|---|---|
| 4,281,023 A * | 7/1981 | Pyves | 426/385 |
| 4,551,340 A * | 11/1985 | El-Hag et al. | 426/438 |
| 4,626,434 A * | 12/1986 | O'Mahony et al. | 426/50 |
| 4,732,081 A * | 3/1988 | Sakuma | 99/407 |
| 5,368,873 A | 11/1994 | Aebi et al. | |
| 5,956,865 A | 9/1999 | Durance et al. | |
| 5,962,057 A | 10/1999 | Durance et al. | |
| 6,159,527 A | 12/2000 | Wettlaufer | |
| 6,312,745 B1 | 11/2001 | Durance et al. | |
| 6,457,403 B1 | 10/2002 | Wettlaufer et al. | |
| 6,479,092 B1 * | 11/2002 | Wettlaufer | 426/639 |
| 6,524,640 B1 * | 2/2003 | Sinha | 426/639 |
| 2007/0218164 A1 | 9/2007 | Stojanovic | |

* cited by examiner

*Primary Examiner* — Rena Dye
*Assistant Examiner* — Preston Smith
(74) *Attorney, Agent, or Firm* — Bobby W. Braxton; Colin P. Cahoon; Carstens & Cahoon, LLP

(57) ABSTRACT

A method for thawing and infusing partially frozen fruits or vegetables. Individually quick frozen fruits or vegetables are introduced into a mixing kettle. An infusion solution is circulated from a solution tank, through a bed of fruits or vegetables, and back to a solution tank. The infusion solution is maintained at a temperature of about 45° to about 50° F. and at a Brix of about 40° to about 50°. The infusion solution is pumped and circulated at a high rate which reduces thaw time but does not result in product degradation. After thawing, the pumping and re-circulating rate is decreased to allow for increased infusion efficiency. Pressure pulses are applied to the product in the mixing tank which decreases the infusion time. Thus, thawed and infused fruit and vegetables are produced quickly and with minimal product degradation.

37 Claims, 3 Drawing Sheets

PROCESSING TECHNIQUE TO THAW PARTIALLY FROZEN FRUITS AND VEGETABLES AND INCORPORATING SOLIDS

BACKGROUND OF THE INVENTION

1. Technical Field

The present invention relates to a method for the simultaneous thawing and infusion of partially frozen fruits and vegetables. Further the invention prevents exposure of the fruit and vegetables to high temperatures which negatively impact product appearance and thus results in a better product.

2. Description of Related Art

Fruits and vegetables are very important in any diet. They provide many nutritional benefits such as antioxidants and many vitamins. However, fruits and vegetables perish fairly quickly and thus other methods have developed to prolong their shelf life.

One such method of prolonging the shelf life of a fruit or vegetable is by freezing. Often a frozen fruit or vegetable when thawed more closely resembles a fresh fruit or vegetable than does a canned fruit or vegetable. In the production of other final products using fruits or vegetables as ingredients, freezing provides processing flexibility. Depending on the fruit and vegetable, individually quick frozen (IQF) fruits and vegetables can be either a whole fruit or vegetable which is then frozen, or cut up pieces of fruits or vegetables which are then frozen. IQF product allows for processing flexibility in that the processing plant does not have to be geographically located in close proximity with the growing operation. Further, because an IQF product has already been soiled, cleaned, and de-stemmed, de-cored, de-pitted, etc., using an IQF product eliminates the necessity for such steps at the processing plant. Finally, because freezing prolongs the shelf life, using IQF product allows processors to produce year round rather than being limited to the relevant growing season. Thus, it is desirable for food processing plants to be able to use IQF products as an ingredient.

Thawing of the IQF products, however, can be very energy intensive. Thawing, as used herein, refers to increasing the IQF product to an internal temperature greater than about 32° F. Traditional methods of thawing IQF product include subjecting them to hot water, steam, etc., which can negatively impact texture, flavor, and the appearance of the fruit or vegetable due to partial cooking of the fruit and vegetables. Such flaws can carry over into the final product. While exposure of IQF product to high temperatures has a negative impact on product characteristics, it also has a negative impact on process microbial stability. Additionally, subjecting the fruit and vegetable to hot water or steam necessarily creates a waste stream comprised of water and fruit or vegetable pieces, typically at elevated temperatures. This results in undesired waste of water, fruit or vegetables, and heat energy Another method food processors employ to enhance fruit or vegetables is infusion. Infusion of fruits and vegetables is a common method to develop shelf stable intermediate and or finished products. Infusion is a process which utilizes the concentration difference of dissolved solids in a solution and the food product to osmotically exchange solids into the food. Many different methods for the infusion of fruits and vegetables are well known in the art. Many of these methods employ varying solutes such as corn syrup solids, fructo-oligosaccharides, fruit juices and other simple sugars which are used to incorporate solids in fruits and vegetables.

An example of prior art that utilizes infusion is illustrated by U.S. Pat. No. 6,524,640 to Sinha. Sinha discloses immersing IQF product into a kettle of infusion solution of corn syrup, glycerin, and salt at a temperature of about 120° F. The kettle is then re-heated and the contents allowed to infuse until the product has reached a target concentration. However, as discussed above, this method includes subjecting the IQF product to high temperatures which can negatively impact the fruit or vegetable.

Accordingly, it is desirable to have a method for the thawing of an IQF product which minimizes the negative impact on the fruit or vegetable, yet which takes place as quickly as possible while reducing energy consumption. It is further desirable that any such method result in increased microbial stability. By minimizing the negative impact on the IQF product, it is desirable to produce a product with improved product appearance, taste, and texture. It is also advantageous to provide an infusion method which can increase the nutritional value of the IQF product while minimizing any damage to the IQF product. Further, it is desirable that the thawing fluid and the infusion solution comprise the same solution, reducing the waste of additional streams. Finally, it is desirable that the method of thawing and infusion take place at the same time and in the same equipment. This will allow for decreased operating expenses, capital expenses, and operating time.

SUMMARY OF THE INVENTION

A method for thawing and infusing partially frozen fruits or vegetables is provided. Partially frozen fruits or vegetables are introduced into a mixing kettle. During thawing, an infusion solution is circulated from a solution tank, through a bed of fruits or vegetables, and back to a solution tank. The infusion solution is maintained at a temperature of about 45° to about 50° F. to avoid microbial growth and at a Brix of about 40° to about 50°. Heat necessary for the thawing can be supplied to the solution tank via a heating jacket on either the solution tank or the mixing kettle. The infusion solution is pumped and circulated at a high rate which reduces thaw time but does not result in product degradation. After the product has been thawed, the pumping and re-circulating rate is decreased to avoid damaging the product. The pressure in the mixing kettle is decreased and then increased. These pressure "pulses" increase the efficiency of infusion by evacuating moisture from the product at lower pressures and then forcing solids from the infusion solution into the pores of the food at elevated pressures. After the product has met the target Brix concentration, the product is removed from the tank. Thus, thawed and infused fruit and vegetables are produced quickly and with minimal product degradation.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicants' invention will now be described with reference to the drawings. Unless otherwise noted, like elements will be identified by identical numbers throughout all figures.

Figure 1:
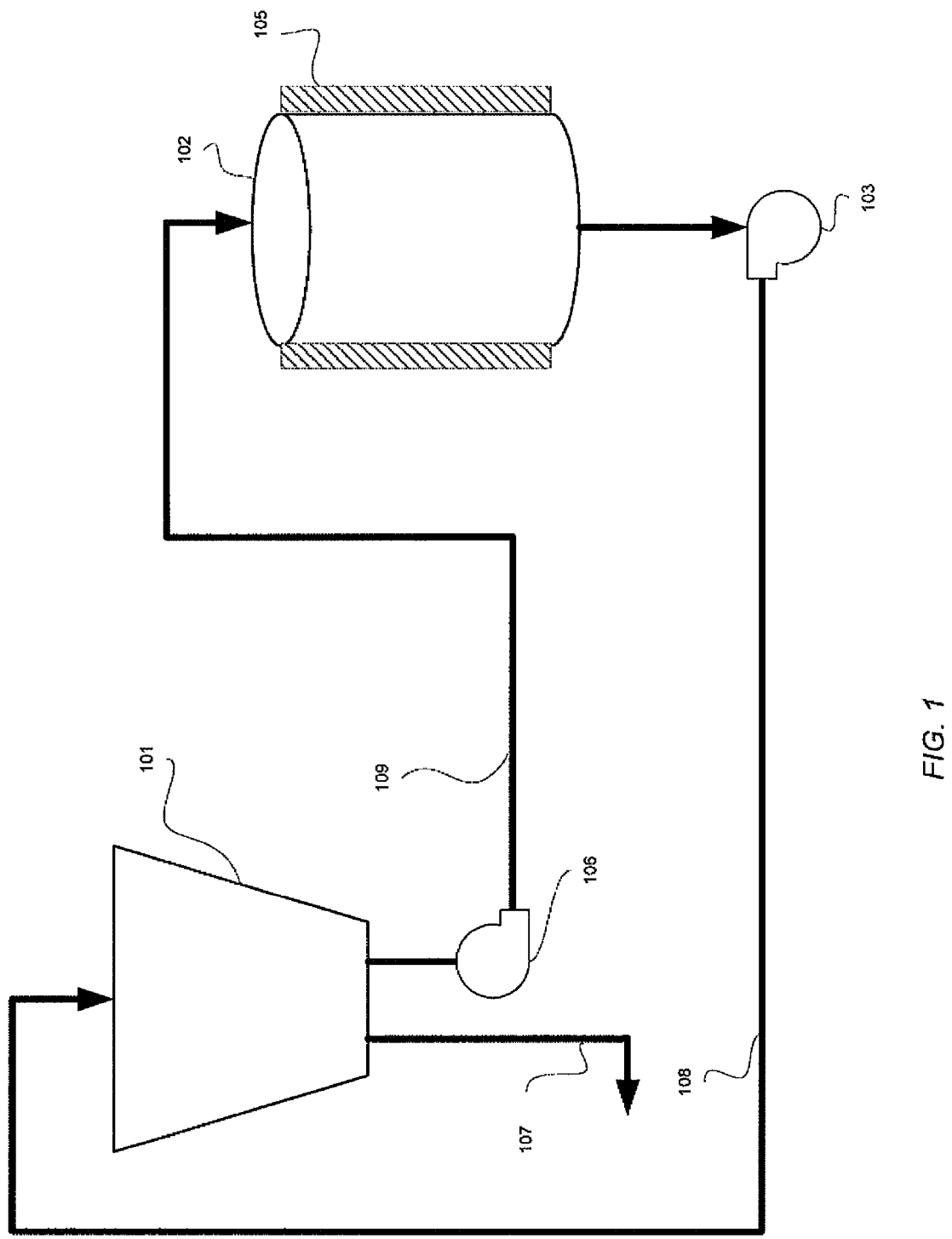
FIG. 1 depicts a schematic illustrating one embodiment of the current invention.

FIG. 1 depicts a schematic illustrating one embodiment of the current invention. FIG. 1 shows only the barest of equipment; support structure and other equipment have been removed for the sake of clarity. FIG. 1 shows a mixing kettle 101, an infusion solution holding tank 102 equipped with a heating jacket 105, a recirculating pump 103, and a solution drain line pump 106. Product is maintained in mixing kettle 101 while infusion solution is circulated through the product in the mixing kettle 101 to the infusion solution holding tank 102 and back to the top of the mixing kettle 101. Each of these will be discussed in more detail below.

Partially frozen product, typically fruits or vegetables, is added to the mixing tank. As used herein "partially frozen product" refers to a product which is at least partially frozen or comprises at least some frozen moisture. Thus, the term partially frozen encompasses product which is fully frozen. Virtually any fruit or vegetable can comprise the partially frozen product so long as the fruit and vegetable is capable of being infused with solids without substantial damage to the internal cellular structure. These include, but are not limited to, apples, banana, bell peppers, blueberries, broccoli, cherries, carrots, cauliflower, corn, cucumber, grapes, green beans, Jack fruit, kiwi, Lychee, mango, melons, onion, peaches, pears, peas, pineapple, potatoes, pumpkin, raspberries, strawberries, squash, taro, zucchini, etc. Further, many meats, poultry, and seafood can also be infused using the current invention. In some embodiments the partially frozen product comprises individually quick frozen (IQF) product. While the embodiments described refer generally to IQF product, it should be noted that the invention is not so limited as it applies to any partially frozen product. As stated above, using IQF product allows for increased processing flexibility. As used herein the terms "IQF product" shall refer to any fruit, vegetable, meat, poultry, or seafood food product which is stored as an IQF product and can be infused with solids. IQF product can have a temperature from about $-10°$ F. to less than about 32° F., but they are typically kept at temperatures of about $-10°$ to about 10° F. The IQF product is added to the mixing kettle 101 by any means known in the art, such as a conveyor, or even manually. The size of the batch of IQF product added to the mixing kettle 101 depends on the size of the mixing kettle 101, the size of the infused product batch desired, and the desired ratio of product to infusion solution. In one trial, about 80 pounds of IQF Pineapples was added to a 50 gallon mixing kettle. This product to gallon ratio is given for illustrative purposes and should not be deemed limiting as the ratio can be adjusted.

The mixing kettle 101 typically comprises at least one agitator (not shown), and almost any agitator known in the art will suffice. However, as one goal of the invention is increased product appearance, texture, and taste, the agitator preferably is an inclined agitator which moves in a sifter fashion. Such an agitator, which moves back and forth like a washing machine, is gentler than traditional agitators. The speed of the agitator should be adjusted to minimize damage to the product.

Both the mixing kettle 101 and the agitator must comprise food grade materials. They can comprise a non-food grade material provided they are coated with a food grade material. Preferably they are coated with a non-stick food grade material which facilitates product removal and sanitation. The mixing kettle 101 further comprises a product drain line 107 and valve (not shown). The product drain line 107 must be large enough to allow product to flow from the mixing kettle 101 after infusion is complete. The sizing of the line 107 also depends on the geometry of the mixing kettle 101. This will be discussed in more detail below.

The mixing kettle 101 can have a level of infusion solution in the tank before IQF product is added to the mixing kettle 101, or infusion solution can be added after all IQF product has been added to the kettle 101. The ratio of infusion solution to IQF product by weight in a preferred embodiment is from about 1.5 to about 3, and in a more preferred embodiment is from about 2 to about 3. Generally, the higher ratios of infusion solution to IQF product cause less damage to the IQF product. The infusion solution can comprise water, sugar, corn syrup, inulin, or virtually any other solution used for adding solids. Further the solution can optionally comprise antimicrobial agents such as Lauric Arginate. Antimicrobial agents, as used herein, are chemicals which inhibit the growth of or kill microorganisms. As used herein infusion solution means a solution which comprises solutes which can add solids, typically with associated nutrition or he/alth benefits, to the IQF product such as vitamins and minerals or other dietary compounds. The infusion solution preferably has an initial Brix concentration of about 40° to about 50° as measured on the Brix scale. The Brix scale refers to a hydrometer scale used for sugar solutions that is graduated so its readings in degrees represent percentages by weight of sugar in a solution at a specified temperature. Thus, Brix refers to a concentration of sugar in a solution by weight. The initial Brix of the IQF product depends on the type of fruit or vegetable to be used, but they are typically less than about 10° Brix. As used herein, sugar refers to a sweetener comprising, for example, fructose, dextrose, or sucrose. The desired Brix of the product after infusion is complete is preferably from about 20° to about 49° Brix. In a more preferred embodiment the final Brix is from about 30° to about 45° Brix.

The infusion solution, either already in the tank or added to the tank after the IQF product, has a temperature of about 45° F. to about 55° F., with a preferred temperature of about 50° F. The prior art teaches thawing the IQF at elevated temperatures which can result in product flaws and microbial issues over typical periods of production. In one embodiments the period of production is about one week. Consequently, much attention must be paid to avoid microbial issues. Thawing with lower temperatures, such as 45° F. to about 55° F., results in decreased product flaws in appearance, taste, and texture. Further, maintaining the infusion solution at such temperatures helps to prevent microbial growth and results in a more microbially stable process.

The mixing kettle 101 is in fluid communication with the infusion solution holding tank 102 by the solution drain line 109. Infusion solution drains from the mixing kettle 101 through the solution drain line 109 and is pumped by the solution drain line pump 106 into the infusion solution holding tank 102. It should be noted that in some embodiments there may be no need for a solution drain line pump 106 if, for example, the solution tank 102 is located below the mixing kettle 101. However, in a preferred embodiment the solution drain line 109 comprises a solution drain line pump 106. The solution drain line pump 106 can comprise any multi-speed food grade pump. Furthers while not shown, in some embodiments it may be desirable to include a filter upstream of the drain line pump 106 to ensure pieces of product do not enter and damage the pump. In one embodiment infusion solution drains from the bottom of said mixing kettle 101 to the top of said infusion solution holding tank 102. The infusion solution holding tank 102 is used to store the infusion solution which is not in the mixing kettle 101. The size of the solution tank 102 depends on the size of the product batches and the desired ratio of IQF product to infusion solution. The solution tank 102 optionally comprises heating jackets 105 as shown, although any heat source is sufficient. Preferably the heating jackets maintain the temperature of the infusion solution at about 45° F. to about 55° F. by using heating fluid at about 130° F., or higher or lower as necessary. The heating fluid can comprise any traditional heating fluid such as water or oil. Thus, the solution tank can by heated by adding hot water to its heating jacket. While heating jackets 105 are described, it should be noted that any heat source may be utilized, including, for example, electric tracing. The goal of the heating jacket 105 is to supply enough heat to thaw the IQF product and bring it to a desired temperature without causing product flaws. Thus, the heating jacket 105 aims to maintain a steady state in regard to temperature by only supplying as much energy as is necessary into the system. Consequently, the temperature of the infusion solution in the solution tank 102 is maintained at about 45° to about 55° F. Heating jackets 105 can alternatively be located on the mixing kettle 101 as well. The heating jackets 105 used on the mixing kettle 101 can be similar to the jackets described for the solution tank 102. For example, the temperature of the infusion solution can be monitored by introducing hot water in the jacket of the mixing kettle 101. However, in a preferred embodiment the solution tank 102 is considerably larger in volume than the mixing kettle 101. As a result, it is usually more preferable to have the heating jacket 105 on the larger solution tank 102 as the larger volume allows for slower and gentler heating.

The solution tank 102 is also in communication with the mixing kettle 101 via a re-circulating line 108 and an associated re-circulating pump 103. The re-circulating pump 103 can comprise any multi-speed food grade pump. In operation, infusion solution flows through product in the mixing kettle 101, through the solution drain line 109 via the solution drain line pump 106, into the solution tank 102, through the product re-circulating line 108 via the re-circulating pump 103, and back into the mixing kettle 101. This presents another alternative for adding heat to the solution tank 102, as the re-circulating line 108 can optionally be directed to a heat exchanger wherein its temperature is raised to the desired temperature. This is an effective method of maintaining the temperature of the infusion solution at a desired set-point. The size of both the re-circulating line 108 and the solution drain line 109 depend on the desired flow as well as the size of both the mixing kettle 101 and the solution tank 102. The solution drain line 109 and the re-circulating line 108 work in concert to maintain a constant level of infusion solution in the mixing kettle 101. Thus, if the mixing kettle 101 is held at a constant level of infusion solution then the flow rate though the re-circulating line 108 is approximately equal to the flow rate of infusion solution through the solution drain line 109. Similarly, the solution drain line pump 106 is pumping at a rate which is approximately equal to the rate of pumping from the re-circulating pump 103. Various equipments such as flow control valves, level indicators, and other process control equipment can be used to achieve approximately equal flow rates through the solution drain line 109 and the re-circulating line 108, and accordingly maintain a relatively constant level in the mixing kettle 101.

Once the IQF product and infusion solution have been added to the mixing kettle 101, the agitator begins to turn. As discussed above it may be desirable to operate the agitator at a decreased speed to avoid damage to the product. Speeds as low as 2 RPM or lower may be desirable. It is desirable to thaw the IQF product in a short time without sacrificing product appearance, taste, or texture. Thaw times of about 20 minutes, without sacrificing product quality, are desirable and possible. During thawing, infusion solution is continuously circulated through the solution drain line 109, into the solution tank 102, and through the re-circulating line 108. This helps during thawing as infusion solution at about 45° to about 50° F. continuously supplies the energy needed to thaw the IQF product. As discussed above, the circulated solution enters at the top of the mixing kettle 101, mixes through the tank and bed of IQF product, and exits the solution drain line 109 at a decreased temperature. This is where it becomes desirable to have the solution tank 102 comprise a larger volume than the mixing kettle 101. As solution at a decreased temperature is introduced into the solution tank 102, the temperature of the solution tank 102 changes very little if the solution tank 102 has a greater volume than the mixing kettle 101. This is a result of the solution tank 102 having a large volume that can absorb the change in temperature and having a heating jacket 105 that can replace lost heat energy. Thus, the heat lost when the higher temperature infusion solution transfers its heat to the lower temperature IQF product is replaced to the infusion solution in the infusion tank 102 by the heating jacket 105. Many control loops are known in the art that allow for reaching a desired set point of the temperature of the infusion solution within the tank by adjusting the amount of external heat provided by the heating jacket 105 or other heat source. For a circulating system, such as that depicted in FIG. 1, the temperature of the solution exiting the re-circulating pump 103 can be set to a desired set point by adjusting the heat supplied by heating jacket 105, ensuring the mixing kettle 101 has a steady flow of fluid at a specified temperature. In other embodiments, as discussed above, it may be desirable to utilize a heat exchanger either alone or in combination with a heating jacket 105 to supply the necessary heat.

As stated above, it is preferable that the IQF product is thawed as quickly as possible without decreasing product quality. One approach to accomplish this is increasing the pumping rate of the infusion solution to and from the mixing kettle 101 to such a rate that the increased pumping rate does not damage the IQF product integrity. This provides more heat energy which is needed to thaw the IQF product. Thus, the re-circulating pump 103 is adjusted to provide for an increased flow rate to the mixing kettle 101, while the solution drain line pump 106 is also adjusted to increase the flow rate through the solution drain line 109. Increasing the flow rate necessarily decreases the thawing time as more heat is being supplied to the IQF product. The heat supplied must be sufficient to increase the IQF product temperature as well as provide for a change in phase. In order to maintain the solution tank at the specified temperature, the amount of heat supplied by the heating jacket 105 is increased to compensate.

For example, IQF pineapple can be thawed adequately and with minimal product degradation at linear velocities of between about 8 to about 11 inches per minute. As used herein linear velocities refers to a distance which a fluid moves in the mixing kettle 101 over a given time. Thus, for a linear velocity of about 8 inches per minute, a fluid flows a distance of about 8 inches in the vertical direction in the mixing kettle 101 over the span of one minute. The optimum rate depends on the specific IQF product to be thawed. The optimum rate is determined by performing the above stated method with a specific IQF product at a specific flow rate and monitoring the product for damage. If excessive product damage is observed after thawing, then the pumping rate is decreased accordingly until an optimal pumping rate is discovered. Likewise, the infusion solution exiting the mixing tank 101 can be monitored. If pieces of fruits or vegetables are discovered in the infusion solution, then the pumping rate is decreased.

Figure 2:
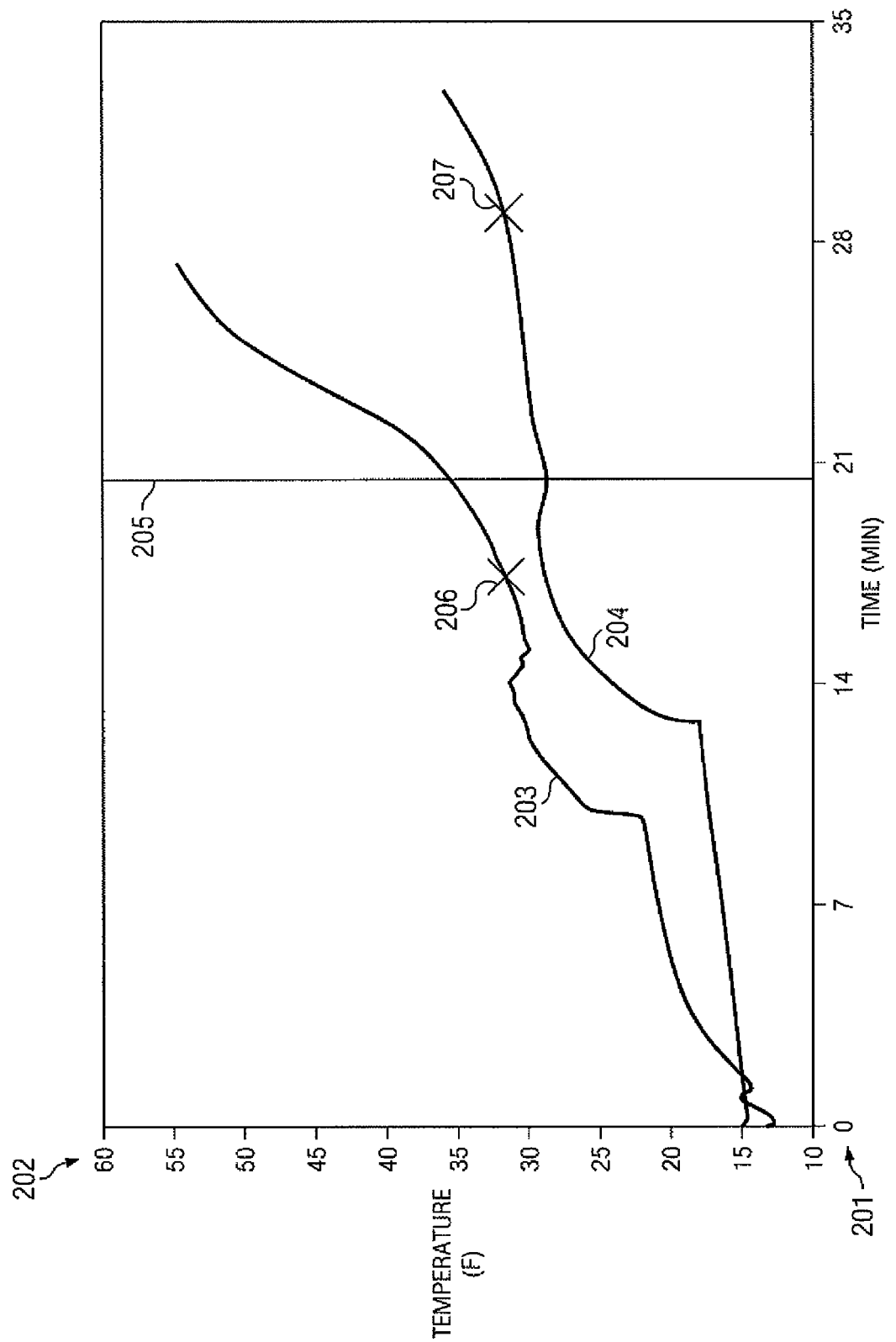
FIG. 2 depicts a graph of thawing time at various flow rates.

FIG. 2 depicts trial results of temperature of IQF pineapples as a function of time at various flow rates. The x-axis 201 depicts time in minutes, and the y-axis 202 depicts temperature in degrees Fahrenheit. The temperature of the pineapple was measured by inserting a thermocouple inside the fruit. The temperature was recorded every second. The top graph 203 represents a flow rate of 12.5 pounds per minute. The bottom graph 204 represents a flow rate of 7.5 pounds per minute. It can be seen that in both graphs 203, 204 the temperature of the IQF pineapple started at or below about 15° F. As can be seen at about twenty minutes as shown by the vertical line 205 only the product with the higher flow rate, represented by the top graph 203, is thawed. The product with the lower flow rate, represented by the bottom graph 204, does not thaw until about 28 minutes as indicated by the position "x" 207 corresponding to a temperature of 32° F. In contrast, the product with the higher flow rate thawed at about 16 minutes as indicated by the position "x" 206 corresponding to a temperature of about 32° F. These results were obtained using a 50 gallon mixing tank and a 300 gallon solution tank. Thus, by increasing the flow rate from about 7.5 pounds per minute to about 12.5 pounds per minute the thaw time decreased by about 12 minutes. A reduction in thaw time of about 12 minutes, as indicated by the trial, results in great economic advantages. If the thaw time for every batch is reduced by about 12 minutes that provides more time for producing more batches with only a slight increase in operating costs and no additional equipment requirements. Such a decrease in operating time results in a reduction of the amount of necessary equipment, and footprint required to maintain increased production capital as the throughput from each mixing kettle 101 is increased.

Thawing can take place at virtually any pressure. The mixing tank can be at a slight vacuum or it can be at an elevated pressure. It should be noted that such changes in pressure can negatively impact product quality. Accordingly, in a preferred embodiment, the thawing takes place at about atmospheric pressure.

Referring back to FIG. 1, after the product has been thawed, the flow rates through both the recirculating line 108 and the solution drain line 109 are reduced to minimize product degradation. Again it should be noted that the same infusion solution is used for both thawing and infusion of the IQF product. Another benefit of using the same solution for both thawing and infusion is that some infusion occurs while the product is thawing. Consequently, the total processing time is decreased compared to a process wherein infusion and thawing do not take place simultaneously.

Once the IQF product has been thawed, it is more susceptible to being bruised, torn, or ripped. While it is true that increasing the flow of infusion solution can increase the rate of infusion, this must be optimized against possible damage to the product. For pineapples it was discovered that linear velocities above 18 inches per minute induced product integrity damage after the initial thawing phase. This is analogous to the optimum flow rate during the thawing phase as the optimum flow rate after thawing is product dependent. The inherent fruit integrity has an impact on the flow rate it can handle without damage. For example, it is anticipated that sturdier fruit can tolerate a higher flow rate than pineapples which are fleshier and therefore more fragile. As stated above, the optimum flow rate can be determined by monitoring the flow rate and product appearance.

Ideally, just as it is desirable to have constant temperatures in the circulation stream, it is likewise desirable to have a constant Brix concentration in the circulation stream. However, as solids are infused from the infusion solution into the product, the solution returning to the solution tank 102 has a lower solids concentration and accordingly a lower Brix than when the same solution exited the recirculating pump 103. Because the osmotic exchange involves the transfer of solids from the infusion solution and moisture to the infusion solution, the returning infusion solution is diluted. It can be seen that over time, the solution becomes solids deficient as the solids are removed by the product and water rich as water is added to the solution by the product. Thus, there is an accumulation of water in the infusion solution. Again, if the solution tank 102 is sufficiently larger than the mixing kettle 101, then the difference in Brix will be minimized. In one embodiment of Applicants' invention the concentration of the infusion solution is allowed to slowly decrease. The Brix of the infusion solution can then be adjusted after each batch or after successive batches when the infusion solution tank 102 has reached a specified low Brix. In a preferred embodiment the infusion solution has a specified low Brix of about 40°. Alternatively, infusion solution of a higher Brix can be added to the solution tank 102 while purging the lower Brix content resulting in a net higher Brix. Such a method is shown in FIG. 3.

Figure 3:
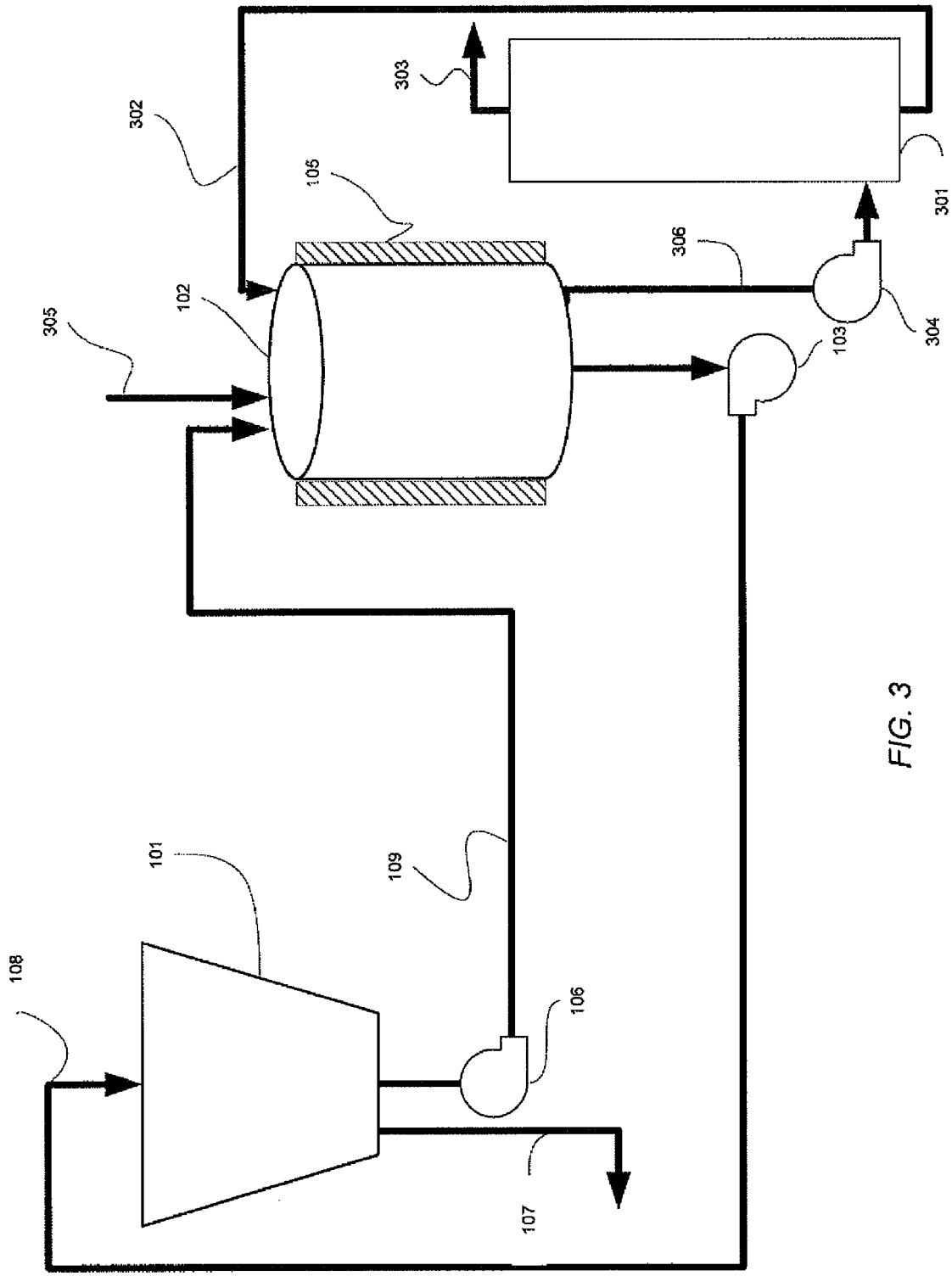
FIG. 3 depicts a schematic illustrating another embodiment of the current invention utilizing a re-concentration system.

FIG. 3 depicts a schematic illustrating another embodiment of the current invention utilizing a re-concentration system. This embodiment comprises an evaporator 301. The evaporator 301 is used to remove the water which accumulates as a result of the osmotic exchange. Re-concentrated infusion solution can be continuously added to the solution tank 102 via a return line 302, or it can add only when a minimum Brix concentration has been reached in the solution tank 102. Further, the Brix of the infusion solution can be adjusted "on-the-fly" at any time, including during infusion. In this operation there is no need to finish a batch before adjusting the Brix of the infusion solution. In operation, the evaporator 301 is supplied infusion solution which has a lower Brix than desired. The infusion solution can be supplied from the re-circulating line 108, from the solution drain line 109, or even from the solution tank 102. In the embodiment shown, infusion solution is drained from the bottom of the solution tank 102 through a low Brix line 306. The infusion solution is pumped by a low Brix pump 304 to the evaporator 301. The low Brix pump 304 can comprise any multi-speed food grade pump. The evaporator 301 boils the infusion solution to remove excess water. The excess water is then condensed by a condenser (not shown) and the water is collected. Because most of what flashes comprises water, the remaining solution has a greater concentration of sugar and solids and thus a higher Brix. The higher Brix solution is then introduced into the solution tank 102 via the return line 302. Such methods can be used to maintain a relatively constant Brix concentration in the infusion solution.

The evaporator 301 can operate at a variety of temperatures and pressures. In one embodiment, the evaporator 301 is heated by steam. A heat source, such as steam, can yield a film temperature in the evaporator 301 which can range from about 212° F. to about 300° F., with a preferred temperature of about 240° F. Typically, lower film temperatures are preferred as they keep the sugar in the solution from browning. At film temperatures greater than about 300° F., the sugar in the infusion solution may begin to brown. This is undesirable as it may negatively impact attributes such as taste and color in the final product. Additionally, although not shown, in one embodiment the infusion solution is directed to a pre-heater which comprises a film temperature of about 130° F. to about 210° F., preferably about 180° F. The film temperature in the pre-heater can be reached using hot water, oil, electric tracing, and other means known in the art. This is desirable in some embodiments as it can increase the efficiency of the evaporator 301 since the infusion solution reaches the evaporator 301 at elevated temperatures. The pressure in the evaporator 301 can also be varied. In one embodiment, the evaporator 301 is operated at about atmospheric pressure. In yet another embodiment, the evaporator 301 is maintained at decreased pressure. The reason for operating at a decreased pressure is that when the pressure is decreased, the boiling temperature of the solution is also decreased. This allows water to be removed from the infusion solution at decreased temperatures which can prevent the sugar in the solution from browning. As stated above, this is desirable as browning of the sugar can negatively impact product quality. In a preferred embodiment the evaporator 301 is operated at about 20 to about 150 torr (absolute). In a more preferred embodiment, the evaporator 301 comprises a pressure of about 100 torr (absolute). It should be noted that operating at decreased pressure increases the capital costs of the equipment as equipment which can operate at a vacuum must be obtained. Likewise, some products produced with this method may have inferior product quality, depending on the type of product and other processing conditions. It is apparent that infusion solution and solute may at times need to be added to replenish the solution as solids are removed from the system with the product. This may take place through the addition line 305. Additionally, it may be desirable at times to discard the infusion solution and get fresher infusion solution. Finally, while one method of re-concentrating the infusion solution has been shown, the current invention is not so limited. Other methods of re-concentrating a solution are known in the art and may be also used in the current invention.

The time necessary to complete infusion is dependent on the flow rate of infusion, the Brix of the infusion solution, the initial and desired Brix of the product, as well as other factors such as pressure. The pressure of the mixing kettle 101 can vary. In a preferred embodiment the pressure of the mixing kettle 101 is generally at about atmospheric pressure but has pulses of lower pressure. Thus, the product in the mixing kettle 101 in a preferred embodiment undergoes periods of depressurization and pressurization. The purpose for these cycles is that it promotes quicker infusion. During the depressurization phase moisture is evacuated from the food product. During the pressurization phase solids from the infusion solution are forced into the pores of the food product. Thus, each of these cycles of depressurization and pressurization promote more efficient infusion, resulting in less infusion time. As most of the resulting efficiency is due to the cycle as a tandem, the evacuation of moisture followed by the forcing of solids through pores, the number of cycles is typically more important than the time spent at either the lower or elevated pressure. The number of cycles and how long each product spends at the lower or elevated pressure is product dependent. Some products only require one cycle, while with other products it is desirable to have multiple cycles of depressurization and pressurization. As used herein the depressurization phase is the total time spent to reduce the pressure and includes the time necessary to reach a desired low pressure and the time spent at the low pressure. Similarly, as used herein the pressurization phase is the total time spent to increase the pressure and includes the time necessary to reach a desired pressure from the depressurized pressure and the time spent at the desired pressure. It is preferred that the depressurization pressure range from about 100 torr to about atmospheric pressure. In a more preferred embodiment the depressurization pressure range from about 200 torr to about 700 torr. It is most preferred that the depressurization pressure range from about 200 torr to about 400 torr. The depressurization phase can last from about 10 seconds to about 10 minutes, more preferably from about 2 minutes to about 10 minutes. In some embodiments, the depressurization phase lasts only about as long as it takes the equipment to reach the desired pressure. The lower pressures, if so desired, can be achieved by any means known in the art such as a vacuum pump. Although not shown, the solution drain line can be attached to a vacuum pump so that infusion solution can be removed from the mixing kettle 101 while the vacuum pump simultaneously pulls the desired vacuum on the mixing kettle 101.

In one embodiment, after depressurization the product is re-pressurized. The pressure can range from about atmospheric pressure to about slightly more than atmospheric pressure. In a preferred embodiment, the pressurization phase returns the kettle 101 to about atmospheric pressure. One benefit of operating the pressurization phase at about atmospheric pressure is financial as it requires less operating costs to operate at about atmospheric pressure. Further, atmospheric pressure is generally preferred as it helps encourage the osmotic exchange. The pressurization phase can be as short as about 10 seconds to as long as about 10 minutes. The length of the pressurization phase, like the depressurization phase, is dependent on the product being infused. After the pressurization phase, the product is either held at the "pressurized" state or the product is reduced to the operating pressure, which in the instance of a "pressurization phase" at atmospheric pressure, are one in the same. Once the operating pressure has been reached, infusion solution can be pumped back into the mixing kettle, allowing for continued infusion.

As stated above, the time necessary to complete infusion is dependent on a variety of factors such as the type of food product, concentration of the infusion solution and the food product, the desired final concentration of the food product, pressure, temperature, and others. The total time for infusion, including thawing as some infusion takes place during thawing, ranges from about 30 minutes to about 3 hours, depending on the above stated factors.

Once the product has been completely infused to form an infused product it is removed from the mixing kettle 101. An aspect of one embodiment of Applicants' invention is to quickly remove product by flushing the product out of the mixing kettle with infusion solution. If properly sized, the valve and line 107 beneath the mixing kettle 101 allows for a flushing action as the product exits the kettle. Additional infusion solution can be introduced to the top of the mixing kettle 101 to further rinse the product from the kettle. The fluid mechanics involved in this flushing is analogous to the rapid evacuation of a commode. This provides for efficient and quick removal of product from within the mixing kettle 101. The infusion solution is then separated from the removed product and then either returned to the solution tank 102 or discarded. The mixing kettle 101, now being empty, is then fed more infusion solution and more IQF product and the entire cycle is continued.

Once product is removed from the mixing tank 101, there are many different paths the product can take. The infusion of the IQF product may be the last step if the infused product is the desired final product. The infused product may, for example, be used as cereal toppings. Alternatively, the infused product can be used as an intermediate ingredient which can then be mixed with other ingredients to make a final product, such as apples in a pie. Even still, the infused product can continue with other operations and can have a final finish applied. As all example of a final finish, the infused product can then be baked and flavored, resulting in, for example, baked flavored apples. Likewise the product can be fried or vacuum fried. The product can also be dried with a variety of methods including drying, vacuum drying, and freeze drying. Further, the product can then be micro waved, vacuum micro waved, or even canned. Virtually any finish that can be applied to natural fruit and vegetables can be applied to the infused fruit and vegetable.

The aforementioned method results in an infused fruit and vegetable product with decreased product flaws. While the invention has been particularly shown and described with reference to a preferred embodiment, it will be understood by those skilled in the art that various changes in form and detail may be made therein without departing from the spirit and scope of the invention.

We claim:

1. A method for thawing and infusing a partially frozen product comprising fruits or vegetables in a mixing kettle comprising an agitator and in communication with an infusion solution holding tank, said method comprising the steps of:
   a) introducing partially frozen product into a mixing kettle;
   b) pumping infusion solution comprising solids from an infusion solution holding tank to said mixing kettle at a first pumping rate;
   c) re-circulating a stream of said infusion solution from said mixing kettle back to said infusion solution holding tank at said first pumping rate;
   d) heating said infusion solution to maintain a constant temperature in the holding tank of about 45° F. to about 55° F.; and
   e) decreasing the rate of pumping and re-circulating said infusion solution to a second rate of pumping and re-circulating.

2. The method of claim 1 further comprising the step of:
   f) varying the pressure within the mixing kettle.

3. The method of claim 2, wherein said varying the pressure of step f) comprises decreasing the pressure of said mixing kettle to about 200 to about 400 torr.

4. The method of claim 2, wherein said varying the pressure of step f) comprises increasing the pressure of said mixing kettle to about atmospheric pressure.

5. The method of claim 1 further comprising the step of:
   f) removing said product from said infusion tank by flushing said infusion tank with said infusion solution.

6. The method of claim 1 wherein said pumping of step b) comprises pumping infusion solution at a temperature of about 45° F. to about 55° F.

7. The method of claim 1 wherein said pumping of step b) comprises pumping infusion solution between about 40° and about 50° Brix.

8. The method of claim 1 further comprising the step of:
   f) re-concentrating said infusion solution.

9. The method of claim 8 wherein said re-concentrating of step f) comprises utilizing an evaporator.

10. The method of claim 9 wherein said re-concentrating of step f) comprises utilizing an evaporator which operates at about 20 to about 150 torr.

11. The method of claim 9 wherein said re-concentrating of step f) comprises utilizing an evaporator comprising a film temperature of about 212° F. to about 300° F.

12. The method of claim 8 wherein said re-concentrating of step f) comprises utilizing a pre-heater.

13. The method of claim 1 wherein said introducing of step a) comprises a fruit or vegetable selected from the following: apples, banana, bell pepper, blueberries, broccoli, cherries, carrots, cauliflower, corn, cucumber, grapes, green beans, Jack fruit, kiwi, Lychee, mango, melons, onion, peaches, pears, peas, pineapples, potatoes, pumpkin, raspberries, strawberries, squash, taro, and zucchini 14. The method of claim 1, wherein said decreasing the rate of said pumping and re-circulating of step e) comprises a linear velocity less than about 18 inches per minute through the mixing kettle.

15. The method of claim 1, wherein said pumping of step b) and re-circulating of step c) comprises a linear velocity less than about 11 inches per minute through the mixing kettle.

16. The method of claim 1, wherein said pumping of step b) and said re-circulating of step c) further comprises maintaining said mixing kettle at about atmospheric pressure.

17. The method of claim 1 further comprising the step of:
   f) applying a final finish to said product.

18. The method of claim 17 wherein said applying a final finish of step f) comprises baking 19. The method of claim 17 wherein said applying a final finish of step f) comprises frying.

20. The method of claim 17 wherein said applying a final finish of step f) comprises vacuum frying.

21. The method of claim 17 wherein said applying a final finish of step f) comprises vacuum drying.

22. The method of claim 17 wherein said applying a final finish of step f) comprises microwaving.

23. The method of claim 17 wherein said applying a final finish of step f) comprises vacuum microwaving.

24. The method of claim 17 wherein said applying a final finish of step f) comprises freeze drying.

25. The method of claim 17 wherein said applying a final finish of step f) comprises canning.

26. The method of claim 1 wherein said heating of step d) comprises providing heat energy via a heating jacket.

27. The method of claim 1 wherein said pumping of step b) comprises pumping infusion solution comprising sugar.

28. The method of claim 1 wherein said pumping of step b) comprises pumping infusion solution comprising antimicrobial agents.

29. The method of claim 1 wherein said pumping of step b) thaws said partially frozen product in less than about 20 minutes.

30. The method of claim 1 wherein said introducing of step a) and said pumping of step b) further comprises introducing said partially frozen product and pumping said infusion solution so that said mixing tank comprises contents which have a ratio by weight of about 1.5 to about 3 infusion solution to said partially frozen product.

31. The method of claim 1 wherein said introducing of step a) comprises introducing individually quick frozen product.

32. The method of claim 1 wherein said second rate of pumping and re-circulating is greater than zero.

33. The method of claim 1 wherein during said decreasing of step e) infusion solution is being re-circulated.

34. The method of claim 2 wherein during said varying of step f) said mixing kettle comprises infusion solution.

35. The method of claim 2 wherein step f) occurs after step b).

36. The method of claim 1 wherein during step b) said mixing kettle comprises partially frozen product.

37. The method of claim 1 wherein said partially frozen product becomes thawed during steps b) through d).

* * * * *